No. 622,610. Patented Apr. 4, 1899.
U. DUDLEY.
CLIP OR BINDER.
(Application filed Jan. 17, 1899.)
(No Model.)
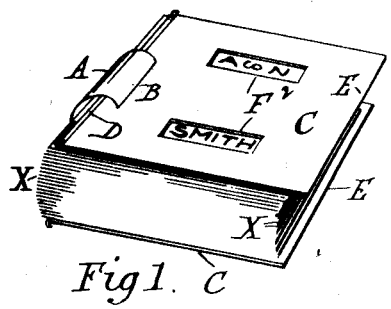
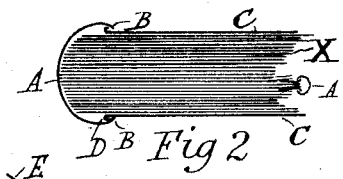
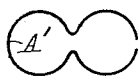
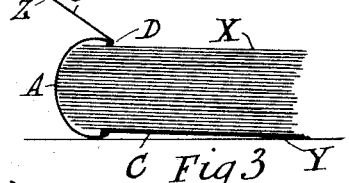
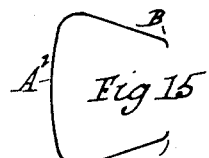
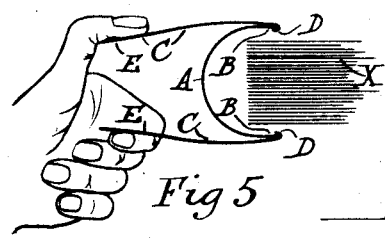
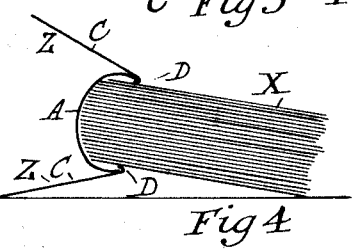
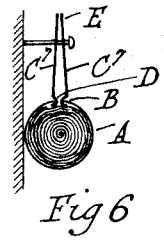
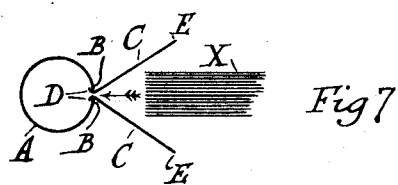
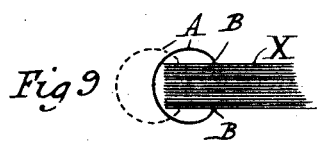
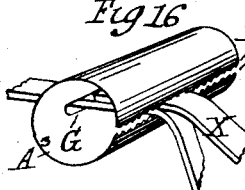
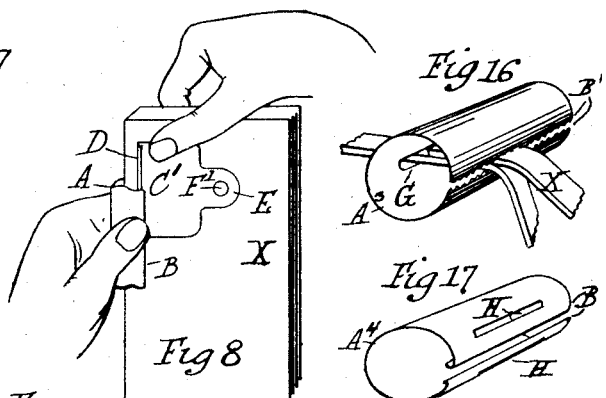
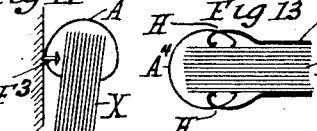
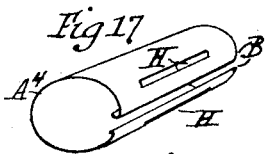
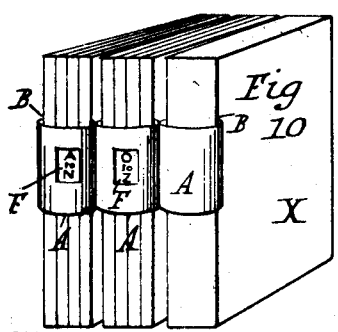
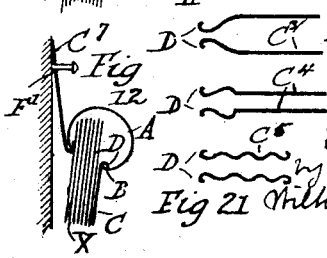
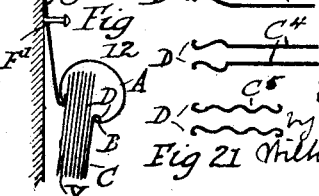
Witnesses:
C. A. Bateman
Percy C. Bowen
Inventor
Uriah Dudley,
by Wilkinson & Fisher,
Attorneys.

UNITED STATES PATENT OFFICE.

URIAH DUDLEY, OF DRAKE, NEW SOUTH WALES.

CLIP OR BINDER.

SPECIFICATION forming part of Letters Patent No. 622,610, dated April 4, 1899.

Application filed January 17, 1899. Serial No. 702,430. (No model.)

*To all whom it may concern:*

Be it known that I, URIAH DUDLEY, mine manager and mining engineer, a subject of the Queen of the United Kingdom of Great Britain and Ireland, residing at Drake, in the Colony of New South Wales, have invented certain new and useful Improvements in Clips or Binders; and I do hereby declare the following to be a full, clear, and exact description of the invention, such as will enable others skilled in the art to which it appertains to make and use the same.

The object of this invention is to produce an improved clip or binder suitable for either permanent or temporary application, for office, manufactory, or domestic use, for holding articles in the flat form or rolled up, and for either hanging up such articles or not at will.

Although clips which are composed of a spring and gripping-plates and means for operating such plates exist in great variety, millions of various kinds being in use, especially for binding together documents, samples, and other things, yet there are advantages in my clip in regard to simplicity, cheapness, compactness, and scope of utility. Superior cheapness is alone a great advantage where clips are used in great numbers; but my clip will also be used where owing to their bulk or other features of their construction other clips are found unsuitable. For example, the documents a business man usually carries in his pocket can be very conveniently kept together by my clip. My clip will also, if required, grip a tapered article along the said taper, which many clips will not do. In practice my clip is essentially composed of a metallic body of strongly-elastic material (preferably spring-steel) and a pair of stiff movable wings, which besides being adapted for holding articles between them are also reversible in position and used to distend the spring-body, no other handles or fulcrums being required. I use wings which either are quite loose and removable (suitably articulated to engage the edges of the spring-body) or are hinged to the spring or otherwise connected more or less permanently. The spring-body is of cylindrical, oval, or other special section, uniform or not in thickness at will with edges which face one another or meet or even overlap, according to the use for which the clip is intended. The forms and proportions of all the parts may vary considerably, the drawings being illustrative of some forms, it being impossible to exhibit the endless designs which may be used.

As my clip has in form some resemblance to a butterfly, with a somewhat similar sweeping movement of the wings, clips of my invention may be termed "butterfly-clips."

Referring now to the accompanying drawings, Figure 1 shows in perspective and Fig. 2 in end view a number of sheets of material bound together in book fashion by my clip, the wings of which are in this instance large, forming covers. A small clip used as a bookmark is also shown in Fig. 2. Figs. 3 and 4 show the end view, as in Fig. 2, but with one and both wings respectively lying open, it being noted that whether a wing is turned up into an open position Z or turned down into the closed position Y shown it will naturally remain where placed. Fig. 5 shows the wings reversed in position and being used as a pair of handles or levers to distend the spring-body, which is thus opened to any desired extent at its edges by the pressure of the thumb and finger on the outer edges of the said wings. A very wide opening of the spring, compared with other clips is obtainable, notwithstanding that the removable wings may be plain metal sheets, except for the articulation or the like at the inner edge. Fig. 6 shows how instead of clipping flat sheets a roll might be clipped and hung up by the wings. Fig. 7 shows in end view a position which the clip can assume and how matter to be clipped, if sufficiently rigid, can be forced into place by pushing it between the wings, as indicated by the arrow. Fig. 8 illustrates one way of removing the wings by drawing the spring or wings longitudinally, leaving the documents or other articles held together by the spring alone. In general use the wings are often left on. Fig. 9 shows an end view, in both firm and dotted lines, of the spring, showing that the grip thereof may be adjusted to be either at the edge of the clipped article or not. Fig.

10 shows the clip used as a pamphlet-binder with wings removed. Fig. 11 shows the clip with wings removed used as a hanger of clipped material. Fig. 12 shows the clip used as a hanger without removing the wings. Fig. 13 shows the spring and wings modified, so that the connections between these parts are not at the spring edges. Figs. 14, 15, 16, and 17 illustrate modified forms of the spring, and Figs. 18, 19, 20, and 21 modified forms of the wings.

In the drawings, X is the material clipped.

A is the spring, modifications of which are shown at A', A², A³, A⁴ in Figs. 14, 15, 16, and 17, respectively. B B' are the edges thereof, which exert pressure on the wings or on the objects clipped.

C are the wings, modifications of which are shown at C', C², C³, C⁴, C⁵, C⁶, and C⁷ in Figs. 8, 18, 19, 20, 21, 13, 6, and 12, respectively.

D is the hook-like edge or like part at the inner edge of each wing by which articulation or engagement with the spring is effected, and E is the outer edge of each wing.

The inner edges D of the wings C may be adjusted differently, as seen by comparing Figs. 1 and 2, and when the inner edges D are pushed far back—i. e., away from the edges B—the pressure of the edges B of the spring is nearer the center of the wings, and consequently as the wings are rigid the pressure is distributed more evenly upon the clipped material, thus in some cases helping to clip it better. The material need not be in several sheets or rigid. It might, for example, be a piece of rubber for erasing, its edge being allowed to project when in use and the wings serving to keep it as rigid as may be necessary. The various figures show perforations F in the spring and F² in the wings (to enable matter to be read through the holes) at the side or back, respectively, of the mass clipped, as in Figs. 1 and 10, or holes F' F³ in the wings and spring are provided, as in Figs. 6, 11, and 12, to enable the clips to be hung up or threaded together. The absence of such handles and projecting parts as other clips possess enables manuscripts, documents, pamphlets, and newspapers of any size to be well bound and arranged side by side or one upon another in such a compact manner as to serve the needs of many libraries and offices better than the ordinary binding, having in view either the time or the expense saved. It is a desideratum to be able to bind periodical publications together (without damaging them by perforations) in book form and serial order, so that every page can be quickly referred to and to be able to add to or subtract from the mass or to unbind the whole at will, and this binding should be such as both to withstand considerable wear and tear and to avoid awkwardness of shape when filled to only a fraction of its holding capacity. I secure these advantages, and by reason of the wings being removable enable them to be utilized with other springs to form clips or reinserted at any time to distend the original spring-body or to serve as covers or parts of covers to the clipped mass.

In hanging up articles in various positions with my clip (vide Figs. 6, 11, and 12) their compactness and the absence of objectionable projections will be evident; also, the additional advantage that if anything strikes or presses the clip it will not press it open and cause the contents to drop out. The end of a number of sheets in the form of a roll might be gripped and suspended from the clips shown in Figs. 11 and 12 as well as simply flat sheets, as shown.

Where thick articles are to be clipped, it is not necessary that the spring edges B should be able to quite or nearly meet, and Fig. 15 shows an end view of an undistended spring with non-meeting edges B, which are intended to receive an object thick enough to expand the spring.

There are many other applications of my invention which need not be illustrated, such as its use as a clothes-peg or to hold closed unsealed mail-matter to be sent through the post, the addressee in the latter case being able to reuse the clip, if so disposed. As a cycle-clip for various purposes the spring may, as in Fig. 14, have a barrel to grasp the tubing of the cycle and another part curved to hold an inflator or other article. If one or both wings be appropriately shaped with sides, my clip becomes a kind of box capable of gripping its contents.

An essential of my clip is distention of the spring by using wings as levers or handles when turned up which when turned down inclose the article gripped. This essential may exist where one or both wings are articulated or hinged to the spring in some manner more permanent than is shown, but which to a skilled mechanic would be obvious, so that the wings would not readily fall away from the spring when being handled.

In Fig. 17 I show apertures H for the passage of the wing edges D through the spring, as seen in end view in Fig. 13. In Fig. 16 I show a slot G for allowing a clipped article to pass through the spring. The edges B' are also serrated. In Fig. 18 I show teeth J in the wings to prevent the slipping of articles gripped. This would be used chiefly with leather or textile material.

It is obvious that many variations and changes in form might be made without departing from the spirit of my invention, and I wish it to be expressly understood that I do not limit myself to the exact details shown and described.

Having thus described my invention, what I claim as new, and desire to secure by Letters Patent of the United States, is—

1. A clip or binder, composed of a spring-body and perforated wings provided with hooked ends engaging said body, said wings being free to swing back and operate directly upon the spring-body as levers for opening the same or as supporting-handles for the clip and free to swing forward and act as binding-plates, substantially as described.

2. A clip or binder, composed of a spring-body and perforated wings each provided with a hooked portion, said body being provided with apertures for the reception of the hooked portions of the wings, substantially as described.

In testimony whereof I affix my signature in the presence of two witnesses.

URIAH DUDLEY.

Witnesses:
 W. H. CUBLEY,
 G. G. TURIN.